United States Patent
Anada et al.

(10) Patent No.: US 6,783,857 B2
(45) Date of Patent: Aug. 31, 2004

(54) GAS BARRIER RESIN COMPOSITION, GAS BARRIER COATING MATERIAL, AND GAS-BARRIER MOLDING

(75) Inventors: Arihiro Anada, Kyoto (JP); Shoji Okamoto, Kyoto (JP); Kenjin Shiba, Kyoto (JP); Hayami Onishi, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 10/181,750

(22) PCT Filed: Dec. 7, 2001

(86) PCT No.: PCT/JP01/10767

§ 371 (c)(1),
(2), (4) Date: Jul. 19, 2002

(87) PCT Pub. No.: WO02/48265

PCT Pub. Date: Jun. 20, 2002

(65) Prior Publication Data

US 2003/0026992 A1 Feb. 6, 2003

(30) Foreign Application Priority Data

Dec. 12, 2000 (JP) ........................................ 2000-377386

(51) Int. Cl.[7] .......................... B32B 27/30; C08L 101/00
(52) U.S. Cl. ..................... 428/412; 428/35.4; 428/36.6; 428/475.8; 428/476.3; 428/483; 428/520; 428/522; 524/321; 525/61; 525/330.3; 525/386
(58) Field of Search ............................. 428/35.4, 36.6, 428/520, 522, 412, 475.8, 476.3, 483; 525/61, 330.3, 386; 524/321

(56) References Cited

U.S. PATENT DOCUMENTS 2,169,250 A  8/1939  Izard
5,560,988 A  * 10/1996  Oba et al. .................. 428/389

FOREIGN PATENT DOCUMENTS

| EP | 0698634 | 2/1996 |
|----|---------|--------|
| EP | 0902066 | 3/1999 |
| JP | 52043855 | 4/1977 |
| JP | 58091775 | 5/1983 |
| JP | 7-102110 | 4/1995 |
| JP | 08041218 | 2/1996 |
| JP | 8-283428 | 10/1996 |
| JP | 9-165483 | 6/1997 |
| JP | 11-79926 | 3/1999 |
| WO | 9530523 | 11/1995 |
| WO | 61369 | 10/2000 |

* cited by examiner

Primary Examiner—D. S. Nakarani
(74) Attorney, Agent, or Firm—Fildes & Outland, P.C.

(57) ABSTRACT

Using a gas barrier resin composition including 83 to 15% by mass of a compound (A) having two or more hydroxyl groups in a molecule thereof and 17 to 85% by mass of a compound (B) in which at least one carboxyl group is bound to each of three or more consecutive carbon atoms in a molecule thereof, wherein the compound (B) is any one of a compound in which no anhydrous structure is made among the carboxyl groups and a compound in which at least one anhydrous structure is made among the carboxyl groups, or using a gas barrier coating agent including the compound (A), the compound (B) and a solvent, the present invention provides a gas barrier molded material, which has high gas barrier property in that it has less reduction of gas barrier property even in a high humidity atmosphere, has excellent transparency, does not generate poisonous gas when it is subjected to an incineration treatment, is friendly to the natural environment because of the non-use of organic solvents, and has good productivity.

27 Claims, No Drawings

GAS BARRIER RESIN COMPOSITION, GAS BARRIER COATING MATERIAL, AND GAS-BARRIER MOLDING

TECHNICAL FIELD

The present invention relates to a gas barrier resin composition, a gas barrier coating agent, and a gas barrier molded material.

BACKGROUND ART

A thermoplastic resin film comprising polyamide, polyester or the like has excellent strength, transparency, moldability and gas barrier property, and so it is broadly used as a wrapping material. However, where the thermoplastic resin film is used for retort food or the like, which needs long-term keeping quality, further higher gas barrier property is required.

Thus, to improve gas barrier property, a laminated film obtained by placing a layer comprising polyvinylidene chloride (PVDC) on the surface of such a thermoplastic resin, is broadly used to, for example, wrap food. However, since PVDC generates an organic substance such as acidic gas when it is incinerated, with a recent increasing interest in the natural environment, there is a strong desire for substitution by other materials.

An example of materials used instead of PVDC is polyvinyl alcohol. A film comprising polyvinyl alcohol does not generate poisonous gas when it is subjected to an incineration treatment and is friendly to the natural environment. However, although the film comprising polyvinyl alcohol is excellent in gas barrier property in a low humidity atmosphere, as the humidity increases, the gas barrier property tends to be sharply reduced. Accordingly, in many cases, such a film is not suitable for wrapping food containing water or the like.

As a material for solving such a problem, there is known a film comprising a copolymer of vinyl alcohol and ethylene (EVOH), or a film obtained by applying EVOH as a coating material onto a thermoplastic resin film. However, it cannot be said yet that the film comprising a copolymer of vinyl alcohol and ethylene has sufficient gas barrier property in a high humidity atmosphere. When EVOH is used as a coating material, EVOH is dissolved in a solvent before use. Since EVOH is hard to dissolve in water, a mixed solvent obtained by mixing water and an organic solvent is used as a solvent. To maintain the gas barrier property in a high humidity atmosphere at a practical level, it is necessary to keep the amount of ethylene contained in EVOH large to a certain extent. When EVOH has such a composition, it becomes hard to dissolve in water. Accordingly, there emerges a need to increase the ratio of an organic solvent in a solvent or to use an organic solvent singly. Nevertheless, in terms of the environmental issue, the use of an organic solvent is not desired, and further, the use of the organic solvent is not preferable because this comes at a high cost due to the necessity of a process of recovering the organic solvent.

Moreover, in Japanese Patent Laid-Open No. 10-237180, is proposed a method of applying a solution comprising a partially neutralized product of polyacrylic acid or polymethacrylic acid and polyvinyl alcohol onto a thermoplastic resin film followed by heat processing in order to impart gas barrier property to the thermoplastic resin film. By this method, however, there is a need for heating at a high temperature for a long time to enhance gas barrier property, and so this method has a problem regarding low productivity. Furthermore, since the thermoplastic resin film is colored by heating at a high temperature for a long time and thereby the appearance is impaired, when the film is used to wrap food or the like, improvement is needed.

Still further, there have previously been known various techniques, in which a film comprising polyvinyl alcohol is allowed to have water resistant property by a crosslinking reaction by addition of a crosslinking agent to polyvinyl alcohol. For example, it is broadly known that a film comprising a polymer containing a maleic acid unit is allowed to have water resistant property by a crosslinking reaction between the above described polymer and a hydroxyl group such as polyvinyl alcohol or polysaccharide. As examples of applying this technique, Japanese Patent Laid-Open No. 8-66991 discloses that a film comprising a 25 to 50% partially neutralized product of an isobutylene/maleic acid anhydride copolymer and polyvinyl alcohol, has excellent water resistant property, and Japanese Patent Laid-Open No. 49-1649 discloses a method of allowing a film to have water resistant property by mixing an alkylvinyl ether-maleic acid copolymer into polyvinyl alcohol.

However, water resistant property imparted to a film by allowing the film to have water resistant property (that is, water insolubility) is a property which differs from gas barrier property. Generally, water resistant property is obtained by crosslinking polymer molecules. In contrast, since gas barrier property is a property of preventing invasion or diffusion of relatively small molecules such as oxygen, the gas barrier property is not always obtained by simply crosslinking polymers. For example, a three-dimensional crosslinked polymer such as epoxy resin or phenol resin has water resistant property, but does not have gas barrier property.

DISCLOSURE OF INVENTION

It is an object of the present invention to provide a molded material having high gas barrier property, which overcomes the above described problems, has excellent transparency, does not generate poisonous gas when it is subjected to an incineration treatment, is preferable in terms of both environmental protection and productivity because it does not use an organic solvent, and is capable of being used in a high humidity atmosphere. In addition, it is another object of the present invention to provide a gas barrier resin composition and a gas barrier coating agent, which can easily realize this molded material.

Through intensive studies directed toward the above objects, the present inventors have found that the above objects can be achieved by forming a molded material with a specific resin composition, or producing a molded material by applying a coating agent containing the specific composition onto the surface of a substrate, thereby completing the present invention.

That is to say, the gist of the present invention is as follows.

The gas barrier resin composition of the present invention is a composition comprising 83 to 15% by mass of a compound (A) having two or more hydroxyl groups in a molecule thereof and 17 to 85% by mass of a compound (B) in which at least one carboxyl group is bound to each of three or more consecutive carbon atoms in a molecule thereof, wherein the compound (B) is any one of a compound in which no anhydrous structure is made among the carboxyl groups and a compound in which at least one anhydrous structure is made among the carboxyl groups, and thereby the obtained gas barrier resin composition has good moldability and excellent gas barrier property.

The gas barrier coating agent of the present invention is an agent comprising 83 to 15% by mass of a compound (A) having two or more hydroxyl groups in a molecule thereof, 17 to 85% by mass of a compound (B) in which at least one carboxyl group is bound to each of three or more consecutive carbon atoms in a molecule thereof, and a solvent, wherein the compound (B) is any one of a compound in which no anhydrous structure is made among the carboxyl groups and a compound in which at least one anhydrous structure is made among the carboxyl groups, and thereby the obtained gas barrier coating agent has good applicability and excellent gas barrier property.

A gas barrier molded material of the present invention comprises the gas barrier resin composition of the present invention, and by an ester linkage between the compound (A) and the compound (B) comprised in the resin composition, the obtained molded material has excellent gas barrier property.

Moreover, another gas barrier molded material of the present invention has excellent gas barrier property by that a coating layer is formed by applying the gas barrier coating agent of the present invention on at least a single side of a substrate.

The gas barrier film of the present invention has excellent gas barrier property by that a coating layer thereof is formed by applying the gas barrier coating agent of the present invention on at least a single side of a substrate film.

According to the method for producing a gas barrier molded material of the present invention, there can be obtained high gas barrier property capable of being practically used in a high humidity atmosphere, by heat processing the gas barrier resin composition of the present invention, curing the above described compound (A) and compound (B) to form an ester linkage between them.

Furthermore, according to the method for producing a gas barrier molded material of the present invention, there can be obtained a molded material with high gas barrier property capable of being practically used in a high humidity atmosphere and excellent transparency by applying the gas barrier coating agent of the present invention on at least a single side of a substrate and drying the coating agent by heating to form a coating layer.

As stated above, by using the gas barrier resin composition or the gas barrier coating agent of the present invention, there can easily be obtained a molded material having high gas barrier property, excellent mechanical strength and excellent transparency. Such a gas barrier molded material can preferably be used as a wrapping material in a broad range of fields including food, agricultural chemicals, pharmaceuticals and cosmetics, and also it can preferably be used for retort food or the like, which needs long-term keeping quality. Moreover, since a molded material obtained by heat processing at a high temperature for a short time is excellent in water resistant property as well as gas barrier property, the molded material comes to have a practical level of gas barrier property even in a high humidity atmosphere and therefore it can preferably be used as a wrapping material especially for food. Furthermore, since the gas barrier molded material of the present invention does not comprise components such as chlorine, even though the material is subjected to an incineration treatment, it does not generate poisonous gas. Further, even though it is a molded material in which a coating agent is used, since there is no need for the use of an organic solvent, the material can preferably be used in terms of the environmental issue.

BEST MODE FOR CARRYING OUT THE INVENTION

The gas barrier resin composition of the present invention needs to comprise, at a specific mixing ratio, both a compound (A) having two or more hydroxyl groups in a molecule thereof, and a compound (B) in which at least one carboxyl group is bound to each of three or more consecutive carbon atoms in a molecule thereof, the compound (B) being a compound in which no anhydrous structure is made among the carboxyl groups or a compound in which at least one anhydrous structure is made among the carboxyl groups. Moreover, the gas barrier coating agent of the present invention needs to comprise the above described compound (A) and compound (B), which are mixed at a specific ratio, and disperse or dissolve the compounds in a solvent thereof.

Thus, by mixing the compound (A) and the compound (B) having a specific structure at a specific ratio in the gas barrier resin composition or coating agent, a molded material having good reactivity between the compound (A) and the compound (B) can be obtained, and further, gas barrier property is imparted to the molded material by an ester linkage between the compound (A) and the compound (B). Such an ester linkage can be generated by heat processing a mixture of the compound (A) and the compound (B). Hence, when a sufficient crosslinking density is obtained by crosslinking between the compound (A) and the compound (B), not only gas barrier property is improved, but also water resistant property is imparted, and thereby there can be obtained a molded material having high gas barrier property of maintaining the property capable of being used in a high humidity atmosphere. Hereinafter, the term "high gas barrier property" of the present invention is used to mean a property of maintaining gas barrier property capable of being used in a high humidity atmosphere.

The gas barrier molded material of the present invention refers to a molded material such as a sheet, a film and a vessel, which comprises the above described gas barrier resin composition, or a molded material obtained by applying the above described gas barrier coating agent onto the surface of a sheet, film or vessel that is used as a substrate.

As described above, such a molded material becomes to be excellent in gas barrier property by an ester linkage between the compound (A) and the compound (B). In addition, this molded material comes to have high gas barrier property, when it is subjected to heat processing for crosslinking at the time of production and thereby a sufficient crosslinking density is obtained. Moreover, heat processing can be performed at a high temperature for a short time because of good reactivity between the compound (A) and the compound (B), and therefore a molded material with excellent transparency can be obtained, which is almost no colored by heat processing. Since this molded material does not comprise components such as chlorine, even though the material is subjected to an incineration treatment, it does not generate a toxic substance. Furthermore, in addition to the above described effects, the molded material, in which a coating agent is used, enables reduction or non-use of an organic solvent used for the coating agent, and therefore it can preferably be used in terms of the environmental issue. Still further, in a case where the coating agent does not comprise an organic solvent, the recovery of the organic solvent is not needed, which results in cost reduction as well as improvement in productivity.

Accordingly, the gas barrier molded material of the present invention can preferably be used as a wrapping material in a broad range of fields such as food, agricultural chemicals, pharmaceuticals and cosmetics, and also can preferably be used as a wrapping material for retort food or the like, which needs long-term keeping quality, or food containing water.

The gas barrier resin composition, the gas barrier coating agent and the gas barrier molded material of the present invention will be explained in detail below.

Examples of the compound (A) having two or more hydroxyl groups in a molecule thereof in the present invention may include any one of a high molecular compound, an oligomer and a low molecular compound. Examples of the high molecular compound include polyvinyl alcohol, polyhydroxyethylmethacrylate, copolymers thereof, an ethylene-vinyl alcohol copolymer, saccharides, various high molecular compounds obtained by hydroxyl group modification, high molecular compounds such as polyethyleneglycol in which both ends are hydroxyl groups, etc. Examples of the oligomer include oligosaccharide, high molecular compounds having a short chain from among the above described high molecular compounds, etc. Examples of the low molecular compound include ethyleneglycol, diethyleneglycol, glycerin, monosaccharide and sugar alcohol etc., and also include catechol (1,2-dihydroxybenzene), resorcinol (1,3-dihydroxybenzene), hydroquinone (1,4-dihydroxybenzene), etc. that are aromatic compounds. In the present invention, in respect of gas barrier property, polyvinyl alcohol is the most preferable among these compounds.

Polyvinyl alcohol can be obtained by known methods involving in complete or partial saponification of a vinyl ester polymer.

Examples of the vinyl ester include vinyl formate, vinyl acetate, vinyl propionate, vinyl pivalate, vinyl versatate, etc., and among these, vinyl acetate is industrially the most preferable vinyl alcohol may be copolymerized with other vinyl compounds to such an extent that the effect of the present invention is not impaired. However, if the ratio of a hydroxyl group in polyvinyl alcohol is too low, the ratio of esterification reaction with the compound (B) decreases, and gas barrier property which is the purpose of the present invention cannot be obtained. Accordingly, the ratio between vinyl alcohol units and other vinyl compound units in polyvinyl alcohol is preferably within a range, at mole ratio, of (vinyl alcohol units)/(other vinyl compound units)=10/90 to 100/0 (mole %). Examples of other vinyl monomers include unsaturated monocarboxylic acid such as crotonic acid, acrylic acid and methacrylic acid or an ester thereof, salt, anhydride, amide, nitriles, unsaturated dicarboxylic acid such as maleic acid, itaconic acid and fumaric acid or a salt thereof, α-olefins containing 2 to 30 carbon atoms, alkylvinyl ethers, vinylpyrrolidones, etc.

As a method of saponificating vinyl ester, the known alkali saponification method or acid saponification method can be applied, and among these, a method of performing decomposition by the addition of alcohol using alkali hydroxide in methanol is preferable. Taking gas barrier property into consideration, the nearer the saponification degree is to 100%, the more preferable it is. Since gas barrier performance tends to decrease when the saponification degree is too low, the degree is preferably 90% or more, and more preferably 95% or more. Moreover, the average polymerization degree of vinyl ester is preferably within a range of 50 to 3,000, more preferably within a range of 80 to 2,500, and most preferably within a range of 100 to 2,000.

Examples of the compound (B) in the present invention, in which at least one carboxyl group is bound to each of three or more consecutive carbon atoms in a molecule thereof, include a compound comprising a structure represented by the following structural formula (1) in a molecule thereof, for example:

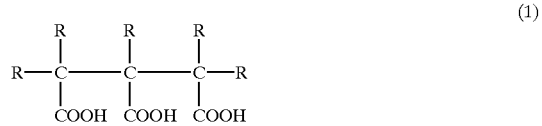

Herein, R represents an atom or atomic group, and may be all identical or all different, or some atoms or atomic groups may be identical. Examples of R may include hydrogen, a halogen atom such as chlorine or bromine, a hydroxyl group, a carboxyl group, an amino group, an amide group, an ester group, a phenyl group, an alkyl group such as a methyl group or ethyl group, etc. Taking waste disposal into consideration, however, it is more preferable that a halogen atom such as chlorine is not included.

Moreover, the compound (B) may be cyclic or may have an aromatic ring. In such a case, the number of R in the structural formula (1) may decrease. Furthermore, in the present invention, a compound having at least one anhydrous structure which is made between two carboxyl groups from the carboxyl groups of the compound (B), also exerts the same effect as the compound represented by the above structural formula (1).

Such a compound may be any one of a high molecular compound, an oligomer and a low molecular compound, but a low molecular compound is more preferable because when the low molecular compound is used, the viscosity is lowered and so it is easily treated. Examples of the high molecular compound or oligomer include polymaleic acid, polymaleic anhydride and a copolymer thereof. Examples of such a copolymer include a (mutual) copolymer of (anhydrous) maleic acid and acrylic acid, etc. In a case where this compound (B) is used as a coating agent as described later, since the compound with a lower viscosity is easily treated, an oligomer having a number average molecular weight of 10,000 or less is preferable. Examples of the low molecular compound include 1,2,3-propanetricarboxylic acid, 1,2,3,4-butanetetracarboxylic acid, citric acid, 1,2,3-benzenetricarboxylic acid, 3-butene-1,2,3-tricarboxylic acid, butane-1,2,3,4-tetracarboxylic acid, 1,2,3,4-cyclopentanetetracarboxylic acid, tetrahydrofuran-2,3,4,5-tetracarboxylic acid, benzenepentacarboxylic acid, benzenehexacarboxylic acid, 1,2,3,4,5,6-cyclohexanehexacarboxylic acid, an anhydride of these compounds, etc. In the present invention, among these compounds, 1,2,3,4-butanetetracarboxylic acid is preferable in respect of reactivity.

1,2,3,4-butanetetracarboxylic acid may be partially esterified or amidated. With regard to carboxyl groups contained in 1,2,3,4-butanetetracarboxylic acid, in a dry state, contiguous carboxyl groups are apt to adopt a cyclodehydrated acid anhydride structure, whereas these groups open a ring and adopt a carboxylic acid structure in a wet state or in an aqueous solution. In the present invention, these closed circular and open circular are not distinguished, and these are described only as 1,2,3,4-butanetetracarboxylic acid.

The gas barrier resin composition of the present invention needs to comprise 83 to 15% by mass of the compound (A) and 17 to 85% by mass of the compound (B), which are constituted as described above. Thus, by using the compound (A) and the compound (B) having a specific structure, the reactivity between the compound (A) and the compound (B) becomes good, and by applying a specific mixing ratio between the compound (A) and the compound (B), a sufficient ester linkage between the compound (A) and the compound (B) can be obtained, and thereby the gas barrier resin composition has excellent gas barrier property. When the mixing ratio of the compound (A) is more than 83% by mass or less than 15% by mass, a sufficient ester linkage between the compound (A) and the compound (B) cannot be obtained, and the gas barrier resin composition becomes poor in gas barrier property. Accordingly, the mixing ratio between the compound (A) and the compound (B) is preferably 65 to 15% by mass of the compound (A) and 35 to 85% by mass of the compound (B), more preferably 60 to 20% by mass of the compound (A) and 40 to 80% by mass of the compound (B), and further preferably 50 to 20% by mass of the compound (A) and 50 to 80% by mass of the compound (B).

Considering reactivity, moldability, mechanical property or the like, it is particularly preferable that the gas barrier resin composition of the present invention is obtained by using polyvinyl alcohol as the compound (A) and 1,2,3,4-butanetetracarboxylic acid as the compound (B) and determining the mixing ratio of both compounds at 50 to 20% by mass of the compound (A) and 50 to 80% by mass of the compound (B). When such a resin composition is used, as described later, a molded material with excellent gas barrier property, transparency and mechanical property can be produced with good moldability.

The constitution and mixing ratio of the compound (A) and the compound (B), which are main ingredients in the gas barrier coating agent of the present invention, are the same as those of the above described gas barrier resin composition. The gas barrier coating agent of the present invention can be obtained by dissolving or dispersing the compound (A) and the compound (B) in a solvent.

The solvent used for the coating agent is not particularly limited, and examples of a suitable solvent include organic solvents such as dimethyl formamide, dimethyl sulfoxide, dimethyl acetamide, glycol and glycerol, water or the like. However, it is better not to use organic solvents to avoid the environment pollution issue, and further, if organic solvents are not used, the recovery of the organic solvents is not needed, resulting in improvement in productivity and realization of cost reduction. Therefore, it is preferable to use water as a solvent. Moreover, where water is used as a solvent, a small amount of a volatile organic solvent such as alcohol may be added in consideration of improvement in solubility, reduction of a drying process, improvement in stability of solution.

In order to use water as a solvent, it is preferable to add an alkali compound when the coating agent is prepared, and in particular, it is preferable to add an alkali compound in an aqueous solution of the compound (B). The compound (B) can be an aqueous solution, but since the compound (B) has lower solubility to water than the compound (A), it tends to be inferior in terms of stability of an aqueous solution. However, by addition of an alkali compound, the carboxyl groups of the compound (B) are neutralized and the solubility to water increases, and thereby stability of the aqueous solution is improved. As a result, the obtained film is found to have exceptionally good gas barrier property. It is appropriate that the mixing ratio of an alkali compound is set at 0.1 to 30 mole % with respect to the carboxyl groups of the compound (B).

As an alkali compound, any alkali compound capable of neutralizing the carboxyl groups of the compound (B) may be used, and examples of such an alkali compound include alkali metals such as sodium hydroxide, potassium hydroxide and calcium hydroxide, alkali-earth metals such as hydroxide, ammonium hydroxide and an organic ammonium hydroxide compound, or the like. Further, by adding an alkali metal salt as the above described alkali compound itself, or using the salt in combination with the alkali compound, gas barrier property is improved as with the case of the use of an alkali compound. As such an alkali metal salt, it is preferable to use phosphate, phosphite, hypophosphite, etc., and in particular, sodium hypophosphite is preferable.

The gas barrier coating agent of the present invention is preferably in a water soluble state in terms of production, and it is not preferable that a large amount of hydrophobic copolymer ingredient is contained in the agent because it impairs water solubility.

The concentration of the solution of the coating agent is determined as appropriate depending on the viscosity or reactivity of the solution, and the technical specification of the device used. However, where an excessively dilute solution is used, it becomes difficult to form a coating layer having a thickness enough to exert gas barrier property, and also, there often occurs a problem that it takes much time in the following drying process. On the other hand, where the concentration of the solution is too high, there may occur problems regarding a mixing operation, preservability, etc. Therefore, the concentration of the solid components of the coating agent of the present invention is preferably within a range of 5 to 60% by mass, and more preferably within a range of 10 to 50% by mass.

The preparation of the coating agent can be carried out according to a known method, using a dissolving kettle equipped with an agitator, or the like. Examples of the agitator used include the known devices such as a homogenizer, a ball mill and a high-pressure dispersion device.

Considering applicability, transparency, the environmental issue or the like, as the gas barrier coating agent of the present invention, it is particularly preferable. to apply a coating agent, which is obtained by using polyvinyl alcohol as the compound (A) and 1,2,3,4-butanetetracarboxylic acid as the compound (B), mixing 0.1 to 30 mole % of an alkali compound with respect to the carboxyl groups of the compound (B), and further using water as a solvent. When such a coating agent is used, as described later, only by applying the coating agent on at least a single side of a substrate, excellent gas barrier property and transparency can be imparted to a molded material.

It should be noted that a thermostabilizer, an antioxidant, a reinforcer, a pigment, a degradation inhibitor, a weatherproofer, a fire retardant, a plasticizer, a mold releasing agent, a lubricant, etc. may be added to the resin composition or coating agent of the present invention to such an extent that the properties of the resin composition or coating agent are not significantly impaired.

Examples of the thermostabilizer, the antioxidant and the degradation inhibitor include hindered phenols, a phosphorus compound, hindered amines, a sulfur compound, a copper compound, a halogenated product of an alkali metal, and a mixture thereof.

Examples of the reinforcer include clay, talc, calcium carbonate, zinc carbonate, wollastnite, silica, alumina, magnesium oxide, calcium silicate, sodium aluminate, sodium alminosilicate, magnesium silicate, glass balloon, carbon black, zinc oxide, zeolite, montmorillonite, hydrotalcite, fluorine mica, metal fiber, metal whisker, ceramic whisker, potassium titanate whisker, boron nitride, graphite, glass fiber, carbon fiber, fullerene ($C_{60}$, $C_{70}$, etc.), carbon nanotube or the like.

Moreover, to the gas barrier resin composition or gas barrier coating agent of the present invention, a small amount of crosslinking agent components can also be added. By mixing a small amount of crosslinking agent, as described later, a crosslinking reaction generated by heat processing progresses smoothly, and water resistant property as well as gas barrier property is improved, so that the resin composition or the coating agent is found to have high gas barrier property.

Examples of the crosslinking agent preferably used include an isocyanate compound, a melamine compound, an epoxy compound, a carbodiimide compound, zirconium salt compound or the like.

The gas barrier molded material of the present invention refers to a molded material comprising the gas barrier resin composition of the present invention, or a molded material obtained by applying the gas barrier coating agent of the present invention on at least a single side of a substrate.

The molded material comprising the gas barrier resin composition of the present invention refers to a solid state molded material with no flowability, for example, such as a sheet, a film and a vessel, which are formed from the above described resin composition. The gas barrier resin composition of the present invention has good moldability, and the obtained molded material is found to have excellent gas barrier property due to crosslinking between the compound (A) and the compound (B), which are comprised in the gas barrier resin composition. As a crosslinking density increases, not only gas barrier property is improved but also water resistant property is imparted, and the molded material is found to have high gas barrier property. In the present invention, an oxygen permeability coefficient at 20° C. in 85% RH that is an index of gas barrier property is preferably 500 ml·$\mu$m/m$^2$·day·MPa or less, and more preferably 300 ml·$\mu$m/m$^2$·day·MPa or less.

Moreover, when the molded material comprising the resin composition is produced, since the compound (A) has good reactivity with the compound (B), a heat processing at a high temperature for a short time, more specifically, a heat processing at 200° C. or higher for 15 seconds or shorter can be carried out. The obtained molded material is only little colored by the heat processing and so it is excellent in transparency. Furthermore, the time required for production can be reduced and improvement in productivity can be realized.

On the other hand, the molded material obtained by using the gas barrier coating agent of the present invention refers to a molded material, the coating layer of which is formed by applying the coating agent of the present invention on at least a single side of a substrate such as a sheet, film or vessel and then drying it. The sheet, film, vessel or the like that is used as a substrate is not particularly limited, but one comprising a thermoplastic resin can preferably be used. In particular, in the present invention, a gas barrier film whose substrate is a film is particularly preferable. Accordingly, hereinafter, taking a gas barrier film as an example of the gas barrier molded material, the details of the film will be explained below.

An example of a substrate film that can preferably be used for the gas barrier film of the present invention is a thermoplastic resin film. Specific examples of such a substrate film include a polyamide resin such as Nylon 6, Nylon 66 or Nylon 46, an aromatic polyester resin such as polyethylene terephthalate, polyethylene naphthalate, polytrimethylene terephthalate, polytrimethylene naphthalate, polybutylene terephthalate or polybutylene naphthalate, an aliphatic polyester resin such as a liquid polyester resin or polylactic resin, a polyolefin resin such as polypropylene or polyethylene, a film comprising polyacetal, polycarbonate, polyarylate, polyphenylene sulfide, polyetherketone, polysulfone, polyethersulfone, polyamideimide, polyetherimide or linear polyimide, a film comprising a mixture of the above listed resins, etc. Considering transparency, among these, a Nylon 6 film and a polyethylene terephthalate film are preferable. Further, considering heat resistance, a film comprising at least one selected from polyarylate, polycarbonate and polyethersulfone is preferable.

The substrate film may be either a monolayer film or a multilayer film, and further may be either an unstretched film or a stretched film.

Examples of a method of producing an unstretched film include a method in which a thermoplastic resin is heated and fused by an extruder followed by extrusion through a T-die, and then the obtained product is cooled and solidified by a chill roll or the like, a method in which a thermoplastic resin is extruded through a circular die and then it is solidified by water cooling or air cooling, or a method in which a thermoplastic resin is dissolved in a solvent and then the obtained solution is casted so as to eliminate and dry the solvent, etc.

Examples of a method of producing a stretched film include a method in which the above produced unstretched film is once reeled up and then a stretching process is carried out thereon, or a method in which a stretching process is carried out in succession without reeling up the unstretched film. As a stretching process, it is preferable to perform a simultaneous biaxial orientation or sequential biaxial orientation. In the present invention, considering the mechanical strength and the thickness uniformity of a film, it is more preferable to apply both a method of stretching a film by extrusion through a flat T-die and a method of stretching a film by a tenter in combination.

To improve the adhesive property between a film and a coating layer, the surface of a substrate film, on which the coating agent is applied, may be subjected to a corona discharge treatment or anchor coating treatment.

To the above constituted substrate film, the gas barrier coating agent of the present invention is applied.

In the invention, it is preferable that the compound (A) is polyvinyl alcohol, the compound (B) is 1,2,3,4-butanetetracarboxylic acid, 0.1 to 30 mole % of an alkali compound is comprised with respect to the carboxyl groups in 1,2,3,4-butanetaracarboxylic acid, and using a coating agent in which water is used as a solvent, a coating layer is formed by applying the coating agent on at least a single side of a substrate film.

A method of applying the coating agent is not particularly limited, and common methods such as a gravure roll coating, a reverse roll coating and a wire bar coating can be used. Since the coating agent of the present invention has good applicability, a coating layer having a uniform thickness can be formed on the surface of a substrate.

Where a stretched film is used as a substrate film, the application of the coating agent may be carried out prior to the stretching of the substrate film, or may be carried out after the stretching of the substrate film. Where a coating is carried out prior to the stretching of the substrate film, there is applied a method in which first an unstretched film is coated and dried, then the obtained film is provided to a tenter type stretching machine to simultaneously stretch the film both in a machine direction and in a transverse direction (simultaneous biaxial orientation), and finally the film is subjected to a drying by heat processing. Otherwise, there may be applied a method in which using a multi heated roll or the like, a film is stretched in the machine direction for coating, and after drying the coating agent, the film is then stretched in the transverse direction by a tenter type stretching machine (sequential biaxial orientation). Moreover, it is also possible to use the stretching in the machine direction and the simultaneous biaxial orientation by a tenter in combination.

The coating agent may be solidified by volatilization of a solvent by air drying, or may be solidified by heat drying. Since the coating layer obtained by heat processing the coating agent comprises the compound (A) and the compound (B), which are bound by an ester linkage, the obtained coating film comes to exert gas barrier property. Moreover, where an alkali compound is mixed into the coating agent, the obtained coating layer comprises not only the above described compound (A) and compound (B), but also the alkali compound.

In the present invention, it is preferable that the coating agent is subjected to heat processing after drying. The compound (A) and the compound (B) comprised in the coating agent have good reactivity with each other, but the reactivity is further improved by performing heat processing, and a crosslinking reaction generates. When a sufficient crosslinking density is obtained by this crosslinking reaction, the coating agent comes to have excellent gas barrier property even in a high humidity atmosphere. In order that such a crosslinking reaction is allowed to generate, the coating film, on which the coating agent has been applied, is preferably subjected to a heat processing at 120° C. or higher, and more preferably subjected to a heat processing at a high temperature of 150° C. or higher. When the temperature of the heat processing is too low, the crosslinking reaction in the coating layer does not sufficiently progress and the gas barrier property tends to be reduced in a high humidity atmosphere. Moreover, considering productivity and energy consumption, it is preferable that the heat processing is carried out for a short time. However, when the time of the heat processing is too short, the above described crosslinking reaction does not sufficiently progress and it becomes difficult to obtain a film having sufficient gas barrier property. In contrast, when the time of the heat processing is too long, while a crosslinking reaction is promoted, coloration may be formed on the film. Accordingly, in the present invention, it is appropriate that the time of the heat processing is usually set at 1 second or longer to 300 seconds or shorter, and preferably set at 3 seconds or longer to 180 seconds or shorter.

The gas barrier property of the coating film depends on the type or thickness of the substrate film and the thickness of the coating layer. In the present invention, the oxygen permeability coefficient of the coating film at 20° C. in 85% RH is preferably 2,500 ml·μm/m²·day·MPa or less, more preferably 1,000 ml·μm/m²·day·MPa or less, and further preferably 500 ml·μm/m²·day·MPa or less.

If the oxygen permeability of the coating film, the oxygen permeability of a thermoplastic resin film and the thickness of the coating layer are found, the oxygen permeability coefficient of the coating layer itself can be obtained by the following formula (1):

$$1/Q_F = 1/Q_B + L/P_C \qquad (1)$$

Herein, $Q_F$ represents the oxygen permeability (ml/m²·day·MPa) of the coating film, $Q_B$ represents the oxygen permeability (ml/m²·day·MPa) of the thermoplastic resin film, $P_C$ represents the oxygen permeability coefficient (ml·μm/m²·day·MPa) of the coating layer, and L represents the thickness of the coating layer (μm).

In the present invention, the oxygen permeability coefficient of the coating layer obtained by the above described formula (1) is preferably 500 ml/m²·day·MPa or less, more preferably 300 ml/m²·day·MPa or less, and further preferably 100 ml/m²·day·MPa or less.

The thickness of the coating layer of the gas barrier film of the present invention is not particularly limited, but to obtain a film having the above described gas barrier property, it is desired that the thickness of the coating layer is set at least 0.1 μm. The upper limit of the thickness of the coating layer is not particularly limited, but since the property of a base film cannot be exploited when the layer is too thick, it is desired that the thickness of the coating layer is usually 100 μm or less, preferably 50 μm or less, more preferably 10 μm or less, and further preferably 5 μm or less.

As described above, with regard to a gas barrier film having a coating agent applied thereon, the thickness of the coating layer having gas barrier property can be reduced. Accordingly, the film can be applied in a broad range of fields, and further, the film has good productivity in that it can be produced for a short time.

Moreover, the gas barrier film of the present invention may be subjected to a laminate processing.

The gas barrier film of the present invention can preferably be used for wrapping articles, from which oxygen should be blocked. Examples of such articles, for which the gas barrier film of the present invention can be used as a package or a sheathing material, include water, a salted product, a boiled product in soy sauce, prepared food, liquid soup, powder soup, dressing, bean paste, mustard, green horseradish paste, seasoning, farm animal meat (ham, sausage, bacon, frankfurt sausage), jerked beef, fish cake, beverage, jelly, rice wine, wine, boiled rice, (aseptic) boiled rice, rice with red beans, a rice ball, rice cake, cheese, pizza toast, ramen needle, table delicacies, confectionery, Japanese cake, steamed bean-jam bun, boiled or retort food (meat sauce, rice gruel, Chinese sauce, a bowl of rice topped with various deli such as a beef bowl, sungan, boiled beans in soy sauce, bamboo shoot, soup, curry, etc.), dip, sweet corns, pet food, bath agent, aromatic agent, shampoo, rinse, body soup, hand soup, covering materials, the sheathing material of electronic components, the sheathing material of transfusion, the use in the field of sterilization treatment, the use for dividing and wrapping medicine, the sheathing material of pharmaceuticals, medical equipment, cosmetics, a tea bag, a tea pack, salts, salty dried food, tape, the sheathing material of cigarettes, etc. Further, the form of the film of the present invention used for wrapping the above listed articles is not particularly limited, but examples of the form commonly used include a four-way bag, a continuously wrapped three-way bag, a gusseted bag, a standing pouch, a covering material, a part of a molded vessel, a pillow bag, etc.

When the gas barrier film of the present invention is used for the above described use and wrapping form, it is preferable that a heat sealable film is laminated on at least one side of the film of the present invention for the use. Examples of the heat sealable film include ones comprising such as polyethylene (PE), polypropylene (PP) and an ethylene-vinyl acetate copolymer (EVA). Moreover, another film having gas barrier property or water vapor barrier property can be further laminated on the film of the present invention to enhance the function. Examples of the film having excellent gas barrier property or water vapor barrier property include an aluminum evaporated (VM) film, a metal-oxide evaporated film, a film comprising polyethylene terephthalate (PET), nylon (NY) or the like, an ethylene-vinyl acetate copolymer saponification product (EVOH), polyvinyl acetate (PVA), etc. Furthermore, a paper may be laminated on the film of the present invention. These films may be laminated singly or a plurality of the films may be laminated in combination. Where such a film is laminated, the position of the gas barrier film of the present invention is not particularly limited, and the film may be located in the most external layer, or both sides of the film may be layered with other films.

When the gas barrier film of the present invention is represented by BF, examples of the specific configuration include BF/PE, BF/PP, BF/EVA, BF/VMPE, BF/Metal-oxide evaporated film, BF/PET, BF/NY, BF/Paper, PE/BF/PE, PP/BF/PE, NY/BF/PE, VMPET/BF/PE, BF/EVOH/PE, PP/BF/PE, BF/BF/PE, PE/BF/NY/PE, PP/BF/NY/PE, Paper/BF/PE, BF/Paper/PE, Paper/PE/BF/PE, BF/PE/Paper/PE, PE/Paper/PE/BF/PE, NY/Paper/PE/BF/PE, NY/PE/BF/PE, PE/PET/PE/BF/PE, PE/PET/PE/BF/PE/BF/PE/PVA/PE, etc., but the usage form of the film of the present invention is not limited thereto.

In the above explanation, as an example of the gas barrier molded material, a gas barrier film in which a film is used as a substrate is described. However, the present invention is not limited thereto, and molded materials in which a sheet or vessel is used as a substrate can exert the same effect by adopting the same configuration as described above.

EXAMPLES

The examples of the present invention will be explained in detail below. However, the examples are not intended to limit the scope of the invention.

Methods of determining the values of various physical properties in examples and comparative examples are as follows.

In respect of an oxygen permeability which is used as an index of gas barrier property, using a device of determining oxygen barrier (Mocon, OX-TRAN 2/20), the oxygen permeability at 20° C. in an atmosphere of 85% RH was determined.

Moreover, in respect of an oxygen permeability coefficient which is used as an index of gas barrier property, using a device of determining oxygen barrier (Mocon, OX-TRAN 2/20), the oxygen permeability at 20° C. in an atmosphere of 85% RH was determined.

Furthermore, in respect of the oxygen permeability coefficient of a coating layer, first the oxygen permeability of a coating film and the oxygen permeability of a substrate film were obtained, then the thickness of the coating layer was obtained from the difference between the average thickness of the substrate film and that of the coating film, and finally the oxygen permeability coefficient of the coating layer was obtained according to the following formula (1):

$$1/Q_F = 1/Q_B + L/P_C \quad (1)$$

Herein, $Q_F$: the oxygen permeability of the coating film (ml/m$^2$·day·MPa), $Q_B$: the oxygen permeability of the thermoplastic resin film (ml/m$^2$·day·MPa), $P_C$: the oxygen permeability coefficient of the coating layer (ml·μm/m$^2$·day·MPa), L: the thickness of the coating layer (μm).

Moreover, the transparency of the film was evaluated by visual observation, and the evaluation was made as follows.

○: the film was colorless

Δ: only a little color was observed on the film

: a considerable amount of color was observed on the film

Example 1

Before a gas barrier film was produced, first, a coating agent was prepared. That is, using polyvinyl alcohol (Unitika Chemical Co., UF-100) having a polymerization degree of 1,000 and a saponification degree of 99.3 or more as a solution comprising the compound (A), an aqueous solution comprising 20% by mass of polyvinyl alcohol was prepared. As a solution comprising the compound (B), using 1,2,3,4-butanetetracarboxylic acid (New Japan Chemical Co., Ltd., Rikacid BTW), an aqueous solution, in which 10 mole % of sodium hydroxide was mixed with respect to the carboxyl groups of the compound (B), was prepared.

Then, both solutions were mixed and stirred so that the mixing ratio between the compound (A) and the compound (B) became the compound (A)/the compound (B)=30/70 (% by mass) at a mass ratio, thereby preparing a coating agent having a solid component concentration of 20% by mass.

This coating agent was applied on one side of a polyester film having a thickness of 12.0 μm (Unitika, a biaxially oriented polyester film, Emblet) using a Mayer bar so that the thickness after drying became about 2 μm. After drying at 100° C. for 2 minutes, a heating processing was carried out thereon at 200° C. for 15 seconds.

The physical properties and so on of the obtained coating film are shown in Table 1.

TABLE 1

| | | Coating Agent | | | | | Coating Film | | | |
|---|---|---|---|---|---|---|---|---|---|---|
| | Substrate Film | Compound (A) | Compound (B) | Mass ratio (A/B) | Thickness of substrate film | Thickness of coating layer | Oxygen permeability of coating film | Oxygen permeability co-efficient of coating film | Oxygen permeability co-efficient of coating layer | Transparency |
| Examples | | | | | | | | | | |
| 1 | PET | PVA | BTC | 30/70 | 12.0 | 2 | 18 | 252 | 37 | ○ |
| 2 | PET | PVA | BTC | 20/80 | 12.0 | 2 | 103 | 1442 | 233 | ○ |
| 3 | PET | PVA | BTC | 40/60 | 12.0 | 2 | 97 | 1358 | 217 | ○ |
| 4 | PET | PVA | BTC | 50/50 | 12.0 | 2 | 109 | 1526 | 248 | ○ |

TABLE 1-continued

| | | Coating Agent | | | | | Coating Film | | | |
|---|---|---|---|---|---|---|---|---|---|---|
| | Substrate Film | Compound (A) | Compound (B) | Mass ratio (A/B) | Thickness of substrate film | Thickness of coating layer | Oxygen permeability of coating film | Oxygen permeability co-efficient of coating film | Oxygen permeability co-efficient of coating layer | Transparency |
| 5 | Nylon6 | PVA | BTC | 30/70 | 15.0 | 1.9 | 19 | 321 | 38 | ○ |
| 6 | PET | PVA | BTC | 30/70 | 12.0 | 2 | 3 | 42 | 6 | Δ |
| 7 | PET | PVA | BTC | 30/70 | 14.0 | 2 | 5 | 70 | 10 | ○ |
| 8 | PAR | PVA | BTC | 30/70 | 120.7 | 2.1 | 17 | 2038 | 35 | ○ |
| 9 | PC | PVA | BTC | 30/70 | 100 | 2.1 | 18 | 1858 | 38 | ○ |
| 10 | PES | PVA | BTC | 30/70 | 100 | 1.9 | 19 | 1967 | 37 | ○ |
| Comparative Examples | | | | | | | | | | |
| 1 | PET | PVA | BTC | 10/90 | 12.0 | 2 | 797 | 11158 | 13928 | ○ |
| 2 | PET | PVA | BTC | 90/10 | 12.0 | 2 | 730 | 10220 | 7729 | ○ |
| 3 | PET | PVA | PAA | 30/70 | 12.0 | 2.1 | 328 | 4622 | 1083 | ○ |
| 4 | Nylon6 | PVA | PAA | 30/70 | 14.8 | 2 | 178 | 2984 | 575 | ○ |
| 5 | PET | PVA | Succinic Acid | 30/70 | 12.0 | 2 | 663 | 9282 | 5035 | X |

PET: Polyethylene terephthalate, PC: Polycarbonate, Compound (A): polyvinyl alcohol, PAA: Polyacrylic acid, PAR: Polyarylate, PES: Polyethersulfone, Compound (B): 1,2,3,4-butanetetracarboxylic acid Examples 2 to 4

The mixing ratio between polyvinyl alcohol and 1,2,3,4-butanetetracarboxylic acid was set as shown in Table 1. Setting other conditions at the same as in Example 1, a coating film was obtained.

The physical properties and so on of the obtained coating film are shown in Table 1.

Example 5

Using an extruder equipped with a T-die (75 mm diameter, a low-compression type single-shaft screw having L/D of 45), a Nylon 6 resin was extruded at a cylinder temperature of 260° C. and a T-die temperature of 270° C. to form a sheet, and then the sheet was brought into tight contact with a chill roll, the surface of which was controlled at a temperature of 10° C. for quenching so as to obtain an unstretched film having a thickness of 150 μm. Then, the unstretched film was introduced into a gravure-roll coater and the coating agent used in Example 1 was applied on one side of the unstretched film using a Mayer bar so that the thickness after drying became about 20 μm, and then was dried at 80° C. for 30 seconds using a hot air dryer.

Subsequently, the unstretched film was provided to a tenter-type simultaneous biaxial stretching machine followed by preheating at a temperature of 100° C. for 2 seconds, and then the film was stretched at 170° C. at a magnification of 3 times in a machine direction and 3.5 times in a transverse direction. After that, a heat processing was carried out at 200° C. for 15 seconds so that the relaxation ratio in the transverse direction became 5%. After cooling to room temperature, the stretched film was reeled up.

The physical properties and so on of the obtained coating film is shown in Table 1.

Example 6

After drying a coating agent, a heat processing was carried out at 200° C. for 5 minutes. Setting other conditions at the same as in Example 1, a coating film was obtained.

The physical properties and so on of the obtained coating film are shown in Table 1.

Example 7

After drying a coating agent, a heat processing was carried out at 220° C. for 15 seconds. Setting other conditions at the same as in Example 1, a coating film was obtained.

The physical properties and so on of the obtained coating film are shown in Table 1.

Example 8

A polyarylate film having a thickness of 100 μm was used as a substrate film. This polyarylate film was prepared according to the following procedure.

First, a polyarylate resin (Unitika, U-polymer, U-100) was dissolved into methylene chloride at room temperature to prepare a dope having a solid component concentration of 20% by mass, and then the dope was casted on a glass plate using a baker-type film applicator. This glass plate was left at room temperature to volatilize methylene chloride, and after tackiness of the surface disappeared, a film was removed from the glass plate by pouring running water. After metallic frames were attached to the four sides of the film, vacuum drying was carried out at 120° C. for 2 hours to completely eliminate a solvent. After the film was gradually cooled to room temperature, the metallic frames were removed from the film so as to obtain a polyarylate film having a thickness of 100 μm.

Using this polyarylate film, after a drying processing, a heat processing was carried out at 180° C. for 3 minutes. Setting other conditions at the same as in Example 1, a coating film was obtained.

The physical properties and so on of the obtained coating film are shown in Table 1.

Example 9

Using a polycarbonate film having a thickness of 100 μm (GE Plastics Japan Ltd., Lexan film) as a substrate, after a drying processing, a heat processing was carried out at 180° C. for 3 minutes. Setting other conditions at the same as in Example 1, a coating film was obtained.

The physical properties and so on of the obtained coating film are shown in Table 1.

Example 10

Using a polyethersulfone film having a thickness of 100 μm as a substrate, after a drying processing, a heat processing was carried out at 180° C. for 3 minutes. Setting other conditions at the same as in Example 1, a coating film was obtained.

The physical properties and so on of the obtained coating film are shown in Table 1.

In Examples 1 to 10, the compound (A) having two or more hydroxyl groups in a molecule thereof and the compound (B) in which at least one carboxyl group is bound to each of three or more consecutive carbon atoms in a molecule thereof, were comprised in a solvent contained in the used coating agent at the mixing ratio of the present invention, and therefore molded materials having excellent gas barrier property were obtained in all of the examples. Moreover, since a heating processing was carried out at a high temperature of 120° C. or higher for 300 second or shorter after curing the coating agent, by a crosslinking reaction between the compound (A) and the compound (B), there were obtained molded materials with high gas barrier property, the oxygen permeability coefficient at 20° C. in 85% RH of which was 2,500 ml·μm/m$^2$·day·MPa or less. Furthermore, all of the coating layers were water-insoluble and have an oxygen permeability coefficient at 20° C. in 85% RH of 500 ml·μm/m$^2$·day·MPa or less, and so the layers had excellent gas barrier property.

What is more, in Example 6, a little brown color appeared on the film, but it did not cause a practical problem.

In the above Examples 1 to 10, when the infrared spectrum of the coating layers was examined by ATR method, a peak derived from the carbonyl of an ester group was observed at the specific 1,717 cm$^{-1}$, and thereby it was confirmed that polyvinyl alcohol was bound to 1,2,3,4-butanetetracarboxylic acid by an ester linkage.

Comparative Examples 1 and 2

As shown in Table 1, the composition of polyvinyl alcohol and 1,2,3,4-butanetetracarboxylic acid was set out of the range of the present invention. Setting other conditions at the same as in Example 1, a coating film was prepared.

The physical properties and so on of the obtained coating film are shown in Table 1.

Comparative Example 3

Polyacrylic acid having a molecular weight of 5,000 (Wako Pure Chemical Industries, Ltd.) was used instead of 1,2,3,4-butanetetracarboxylic acid. Setting other conditions at the same as in Example 1, a coating film was prepared.

The physical properties and so on of the obtained coating film are shown in Table 1.

Comparative Example 4

Using a biaxially oriented Nylon 6 film (Unitika, Emblem) having a thickness of 15 μm as a substrate film, polyacrylic acid was used instead of 1,2,3,4-butanetetracarboxylic acid. Setting other conditions at the same as in Example 1, a coating film was prepared.

The physical properties and so on of the obtained coating film are shown in Table 1.

Comparative Example 5

Succinic acid (Nacalai Tesque, reagent chemical) was used instead of 1,2,3,4-butanetetracarboxylic acid. Setting other conditions at the same as in Example 1, a coating film was prepared.

The physical properties and so on of the obtained coating film are shown in Table 1.

In Comparative examples 1 and 2, since the composition of polyvinyl alcohol and 1,2,3,4-butanetetracarboxylic acid was out of the range of the present invention, the oxygen permeability coefficient of the coating films was more than 2,500 ml·μm/m$^2$·day·MPa and the oxygen permeability coefficient of the coating layers was more than 500 ml·μm/m$^2$·day·MPa, and therefore both of the obtained coating films had poor gas barrier property.

In Comparative examples 3 and 4, since the structure of polyacrylic acid differed from that of the compound (B) in the present invention, although a large amount of carboxyl groups were comprised, the reactivity between the compound (A) and the compound (B) was low. Accordingly, although a heat processing was carried out at a high temperature, the obtained coating films did not have sufficient gas barrier property. In Comparative example 5 also, since the structure of succinic acid differed from that of the compound (B) in the present invention, the obtained coating film did not have sufficient gas barrier property. Moreover, a considerable amount of color appeared on the film.

What is claimed is:

1. A gas barrier resin composition, wherein
    the composition comprises 50 to 15% by mass of a compound (A) having two or more hydroxyl groups in a molecule thereof and 50 to 85% by mass of a compound (B) in which at least one carboxyl group is bound to each of three or more consecutive carbon atoms in a molecule thereof, and
    said compound (B) is any one of a compound in which no anhydrous structure is made among the carboxyl groups and a compound in which at least one anhydrous structure is made among the carboxyl groups.

2. The gas barrier resin composition according to claim 1, wherein the compound (A) is polyvinyl alcohol.

3. The gas barrier resin composition according to claim 1, wherein the compound (B) is 1,2,3,4-butanetetracarboxylic acid.

4. A gas barrier coating agent, wherein
    the agent comprises 50 to 15% by mass of a compound (A) having two or more hydroxyl groups in a molecule thereof, 50 to 85% by mass of a compound (B) in which at least one carboxyl group is bound to each of three or more consecutive carbon atoms in a molecule thereof, and a solvent, and
    said compound (B) is any one of a compound in which no anhydrous structure is made among the carboxyl groups and a compound in which at least one anhydrous structure is made among the carboxyl groups.

5. The gas barrier coating agent according to claim 4, wherein 0.1 to 30 mole % of an alkali compound is mixed with respect to a carboxyl group(s) comprised in the compound (B).

6. The gas barrier coating agent according to claim 4, wherein the solvent is water.

7. The gas barrier coating agent according to claim 4, wherein the compound (A) is polyvinyl alcohol.

8. The gas barrier coating agent according to claim 4, wherein the compound (B) is 1,2,3,4-butanetetracarboxylic acid.

9. A gas barrier molded material, wherein
    the material comprises a resin composition comprising 50 to 15% by mass of a compound (A) having two or more hydroxyl groups in a molecule thereof and 50 to 85% by mass of a compound (B) in which at least one carboxyl group is bound to each of three or more consecutive carbon atoms in a molecule thereof, and said compound (B) is any one of a compound in which no anhydrous structure is made among the carboxyl groups and a compound in which at least one anhydrous structure is made among the carboxyl groups, and said compound (A) is bound to said compound (B) by an ester linkage.

10. The gas barrier molded material according to claim 9, wherein an oxygen permeability coefficient at 20° C. in 85% RH is 500 ml·$\mu$m/m$^2$·day·MPa or less.

11. The gas barrier molded material according to claim 9, wherein the compound (A) is polyvinyl alcohol.

12. The gas barrier molded material according to claim 9, wherein the compound (B) is 1,2,3,4-butanetetracarboxylic acid.

13. A gas barrier molded material, wherein a coating layer is formed by applying, on at least a single side of a substrate, a coating agent comprising 50 to 15% by mass of a compound (A) having two or more hydroxyl groups in a molecule thereof, 50 to 85% by mass of a compound (B) in which at least one carboxyl group is bound to each of three or more consecutive carbon atoms in a molecule thereof, and a solvent, and said compound (B) is any one of a compound in which no anhydrous structure is made among the carboxyl groups and a compound in which at least one anihydrous structure is made among the carboxyl groups.

14. The gas barrier molded material according to claim 13, wherein the substrate is any one of a film, a sheet and a vessel.

15. The gas barrier molded material according to claim 13, wherein, in the coating layer, 0.1 to 30 mole % of an alkali compound is comprised with respect to a carboxyl group(s) comprised in the compound (B).

16. The gas barrier molded material according to claim 13, wherein the compound (A) is polyvinyl alcohol.

17. The gas barrier molded material according to claim 13, wherein the compound (B) is 1,2,3,4-butanetetracarboxylic acid.

18. The gas barrier molded material according to claim 13, wherein the compound (A) and the compound (B), which form the coating layer, are bound to each other by an ester linkage.

19. A gas barrier film, wherein a coating layer is formed by applying, on at least a single side of a substrate film, a coating agent comprising 50 to 15% by mass of a compound (A) having two or more hydroxyl groups in a molecule thereof, 50 to 85 % by mass of a compound (B) in which at least one carboxyl group is bound to each of three or more consecutive carbon atoms in a molecule thereof, and a solvent, and said compound (B) is any one of a compound in which no anhydrous structure is made among the carboxyl groups and a compound in which at least one anhydrous structure is made among the carboxyl groups.

20. The gas barrier film according to claim 19, wherein the compound (A) is polyvinyl alcohol.

21. The gas barrier film according to claim 19, wherein the compound (B) is 1,2,3,4-butanetetracarboxylic acid.

22. The gas barrier film according to claim 19, wherein the substrate film is a film comprising Nylon 6 or polyethylene terephthalate, or a film comprising at least one selected from polyarylate, polycarbonate and polyethersulfone.

23. The gas barrier film according to claim 19, wherein an oxygen permeability coefficient at 20° C. in 85% RH is 2,500 ml·$\mu$m/m$^2$·day·MPa or less.

24. The gas barrier film according to claim 19, wherein the oxygen permeability coefficient of the coating layer at 20° C. in 85% RH is 500 ml·$\mu$m/m$^2$·day·MPa or less.

25. A method for producing a gas barrier molded material, wherein the method comprises heat processing a resin composition comprising 50 to 15% by mass of a compound (A) having two or more hydroxyl groups in a molecule thereof and 50 to 85% by mass of a compound (B) in which at least one carboxyl group is bound to each of three or more consecutive carbon atoms in a molecule thereof, and said compound (B) is any one of a compound in which no anhydrous structure is made among the carboxyl groups and a compound in which at least one anhydrous structure is made among the carboxyl groups, forming an ester linkage between said compound (A) and said compound (B), and hardening it.

26. The method for producing a gas barrier molded material according to claim 25, wherein the heat processing is carried out at a temperature of 120° C. or higher for 300 seconds or shorter.

27. A method for producing a gas barrier molded material, wherein the method comprises applying, on at least a single side of a substrate, a coating agent comprising 50 to 15% by mass of a compound (A) having two or more hydroxyl groups in a molecule thereof, 50 to 85% by mass of a compound (B) in which at least one carboxyl group is bound to each of three or more consecutive carbon atoms in a molecule thereof, and a solvent, wherein said compound (B) is any one of a compound in which no anhydrous structure is made among the carboxyl groups and a compound in which at least one anhydrous structure is made among the carboxyl groups, and drying said coating agent by heating to form a coating layer.

* * * * *

UNITED STATES PATENT AND TRADEMARK OFFICE
CERTIFICATE OF CORRECTION

PATENT NO. : 6,783,857 B2
DATED : August 31, 2004
INVENTOR(S) : Arihiro Anada et al.

It is certified that error appears in the above-identified patent and that said Letters Patent is hereby corrected as shown below:

<u>Title page,</u>
Item [54], Title, "MATERIAL" should be -- AGENT -- and "MOLDING" should be
-- MOLDED MATERIAL --.

Signed and Sealed this

Twenty-sixth Day of July, 2005

JON W. DUDAS
*Director of the United States Patent and Trademark Office*